(12) United States Patent
Warkentin et al.

(10) Patent No.: US 10,261,800 B2
(45) Date of Patent: *Apr. 16, 2019

(54) INTELLIGENT BOOT DEVICE SELECTION AND RECOVERY

(71) Applicant: Microsoft Technology Licensing, LLC, Redmond, WA (US)

(72) Inventors: Andrei Warkentin, Sammamish, WA (US); Jacob Oshins, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 73 days.

This patent is subject to a terminal disclaimer.

(21) Appl. No.: 15/498,211

(22) Filed: Apr. 26, 2017

(65) Prior Publication Data
US 2017/0293491 A1  Oct. 12, 2017

Related U.S. Application Data

(63) Continuation of application No. 14/325,347, filed on Jul. 7, 2014, now Pat. No. 9,665,378, which is a continuation of application No. 12/732,021, filed on Mar. 25, 2010, now Pat. No. 8,775,781.

(51) Int. Cl.
*G06F 9/44* (2018.01)
*G06F 9/4401* (2018.01)

(52) U.S. Cl.
CPC ............ *G06F 9/4401* (2013.01); *G06F 9/441* (2013.01); *G06F 9/4416* (2013.01)

(58) Field of Classification Search
CPC .................................................... G06F 9/4416
See application file for complete search history.

(56) References Cited

U.S. PATENT DOCUMENTS

| | | |
|---|---|---|
| 6,820,214 B1 | 11/2004 | Cabrera et al. |
| 7,069,431 B2 | 6/2006 | Dayan et al. |
| 7,370,324 B2 | 5/2008 | Goud et al. |
| 7,574,709 B2 | 8/2009 | Erlingsson et al. |
| 8,185,727 B2 | 5/2012 | Joshi et al. |
| 2005/0081212 A1 | 4/2005 | Goud et al. |
| 2006/0212695 A1* | 9/2006 | Oguma ................. G06F 9/4416 713/2 |
| 2007/0260831 A1 | 11/2007 | Michael et al. |
| 2009/0006534 A1 | 1/2009 | Fries et al. |
| 2009/0094603 A1 | 4/2009 | Hiltgen et al. |
| 2009/0271600 A1 | 10/2009 | Joshi et al. |
| 2009/0287918 A1 | 11/2009 | Goldstein et al. |

FOREIGN PATENT DOCUMENTS

CN  101443748 A  5/2009

OTHER PUBLICATIONS

"First Office Action and Search Report Issued in Chinese Patent Application No. 201110081373.2", dated Feb. 28, 2015, 15 Pages.

(Continued)

*Primary Examiner* — Albert Wang
(74) *Attorney, Agent, or Firm* — Baker & Hostetler LLP

(57) ABSTRACT

Techniques for recovering virtual machine state and boot information used to boot an installed guest operating system on systems where the information has either been lost or is not present are described.

17 Claims, 12 Drawing Sheets

(56) References Cited

OTHER PUBLICATIONS

"Fourth Office Action Issued in Chinese Patent Application No. 201110081373.2", dated May 4, 2017, 6 Pages.
"Office Action Issued in Chinese Patent Application No. 201110081373.2", dated Apr. 26, 2017, 2 Pages.
"Second Office Action and Search Report Issued in Chinese Patent Application No. 201110081373.2", dated Oct. 28, 2015, 17 Pages.
"Third Office Action Issued in Chinese Patent Application No. 201110081373.2", dated May 17, 2016, 18 Pages.
"Non Final Office Action Issued in U.S. Appl. No. 12/732,021", dated Aug. 30, 2013, 7 Pages.
"Notice of Allowance Issued in U.S. Appl. No. 12/732,021", dated Feb. 28, 2014, 5 Pages.
"Corrected Notice of Allowance Issued in U.S. Appl. No. 14/325,347", dated Mar. 21, 2017, 4 Pages.
"Final Office Action Issued in U.S. Appl. No. 14/325,347", dated Oct. 6, 2016, 4 Pages.
"Non Final Office Action Issued in U.S. Appl. No. 14/325,347", dated Mar. 25, 2016, 6 Pages.
"Notice of Allowance Issued in U.S. Appl. No. 14/325,347", dated Jan. 30, 2017, 7 Pages.
"Final Office Action Issued in Chinese Patent Application No. 201110081373.2", dated Dec. 1, 2016, 8 Pages.
"Backup Exec 12.5 Agent for Microsoft Virtual Servers FAQ", Retrieved from <<http://webcache.googleusercontent.com/search?q=cache:o_2-gVUxWUAJ:eval.symantec.com/mktginfo/enterprise/other_resources/b-other_resources_be_12_5_amvs_faq_102008.pdf+&cd=1&hl=en&ct=clnk&gl=in>>, Retrieved Date: Jan. 22, 2010, 11 Pages.
"How to Create a Virtual PC Hard Disk Image by Using a Backup Disk Image File", Retrieved from <<https://web.archive.org/web/20071017034626/http://support.microsoft.com/kb/912826>>, Dec. 19, 2007, 3 Pages.
"Running Windows on Intel-based Macs", Retrieved from <<https://web.archive.org/web/20100102012344/http://www.macwindows.com/winintelmac.html>>, Retrieved Date: Jan. 22, 2010, 6 Pages.
"VMware Infrastructure 3 Online Library: Storage Architecture", Retrieved from <<http://pubs.vmware.com/vi3/intro/Introduction_chapter.3.11.html>>, Retrieved Date: Jan. 22, 2010, 4 Pages.
"Non Final Office Action Issued in U.S. Appl. No. 12/732,021", dated Jan. 4, 2013, 7 Pages.

\* cited by examiner ded from the filesystem into memory will start executing on processor cores, which in turn will access memory to retrieve information from memory and write information back to memory.

INTELLIGENT BOOT DEVICE SELECTION AND RECOVERY

CROSS REFERENCE TO RELATED CASES

This application is a continuation of U.S. patent application Ser. No. 14/325,347, filed on Jul. 7, 2014, which is a continuation of U.S. patent application Ser. No. 12/732,021, filed on Mar. 25, 2010 (now U.S. Pat. No. 8,775,781, issued Jul. 8, 2014), the entirety of which is incorporated herein by reference.

BACKGROUND

Virtual Machine systems store entire state of virtual machines, including the configuration information, snapshots, the number of network adaptors including the networks they are attached to, and the contents of the virtual disks, e.g., the representation of data presented to the virtual machine in various virtual disk files. Typically the data portion of a virtual disk file is stored in a separate file than the virtual machine configuration information. Since most end users are usually interested in only the data and not, for example, the state information for the virtual machine, administrators regularly throw away configuration information file and preserve only the file that stores the virtual disk data.

When state information is lost an administrator has to recreate it; which today is re-creatable but is becoming increasingly frustrating as virtual machines start booting from devices that are not virtual hard disk (VHD) files and virtual firmware increasingly stores more state information. Accordingly, techniques for ensuring that configuration information for virtual machines is not lost are desirable.

Machines (virtual and physical) are moving toward using firmware that conforms to the Uniform Extensible Firmware Interface (UEFI) specification. UEFI compliant firmware includes additional information that is used to boot an operating system (such as the path to the boot loader) inside non-volatile random access memory (NVRAM). If a boot disk is moved to another machine, this information would need to be repopulated before the operating system could be booted. For example, in a physical environment, when physical machines boot from storage area networks (SANs) and operating systems on the SAN are cloned and booted on another physical machines this information is missing. Similarly, this problem is exacerbated in a virtual machine environment because administrators typically deploy a common image of an operating system to multiple virtual machines and move the virtual machines from one physical host to another. Accordingly, techniques for enhancing the boot process for migratable operating systems using firmware that stores information used in the boot process are desirable.

SUMMARY

An example embodiment of the present disclosure describes a method. In this example, the method includes, but is not limited to detecting, prior to booting a guest operating system, a path, stored in firmware, to a boot loader, wherein the boot loader is configured to load a guest operating system stored on a boot disk, wherein the guest operating system is configured to execute in a virtual machine; and storing, prior to booting the guest operating system, the path to the boot loader on the boot disk. In addition to the foregoing, other aspects are described in the claims, drawings, and text forming a part of the present disclosure.

An example embodiment of the present disclosure describes a method. In this example, the method includes, but is not limited to detecting virtual machine configuration information stored on a boot disk for a guest operating system prior to booting the guest operating system in a virtual machine; effectuating the virtual machine in accordance with at least a portion of the detected virtual machine configuration information; and booting the guest operating system in the virtual machine. In addition to the foregoing, other aspects are described in the claims, drawings, and text forming a part of the present disclosure.

An example embodiment of the present disclosure describes a method. In this example, the method includes, but is not limited to detecting, prior to booting an operating system, configuration information stored on a boot disk for the operating system, wherein the configuration information describes a physical machine that effectuated the operating system; effectuating a virtual machine in accordance with at least a portion of the configuration information; and booting the operating system in the virtual machine as a guest operating system. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
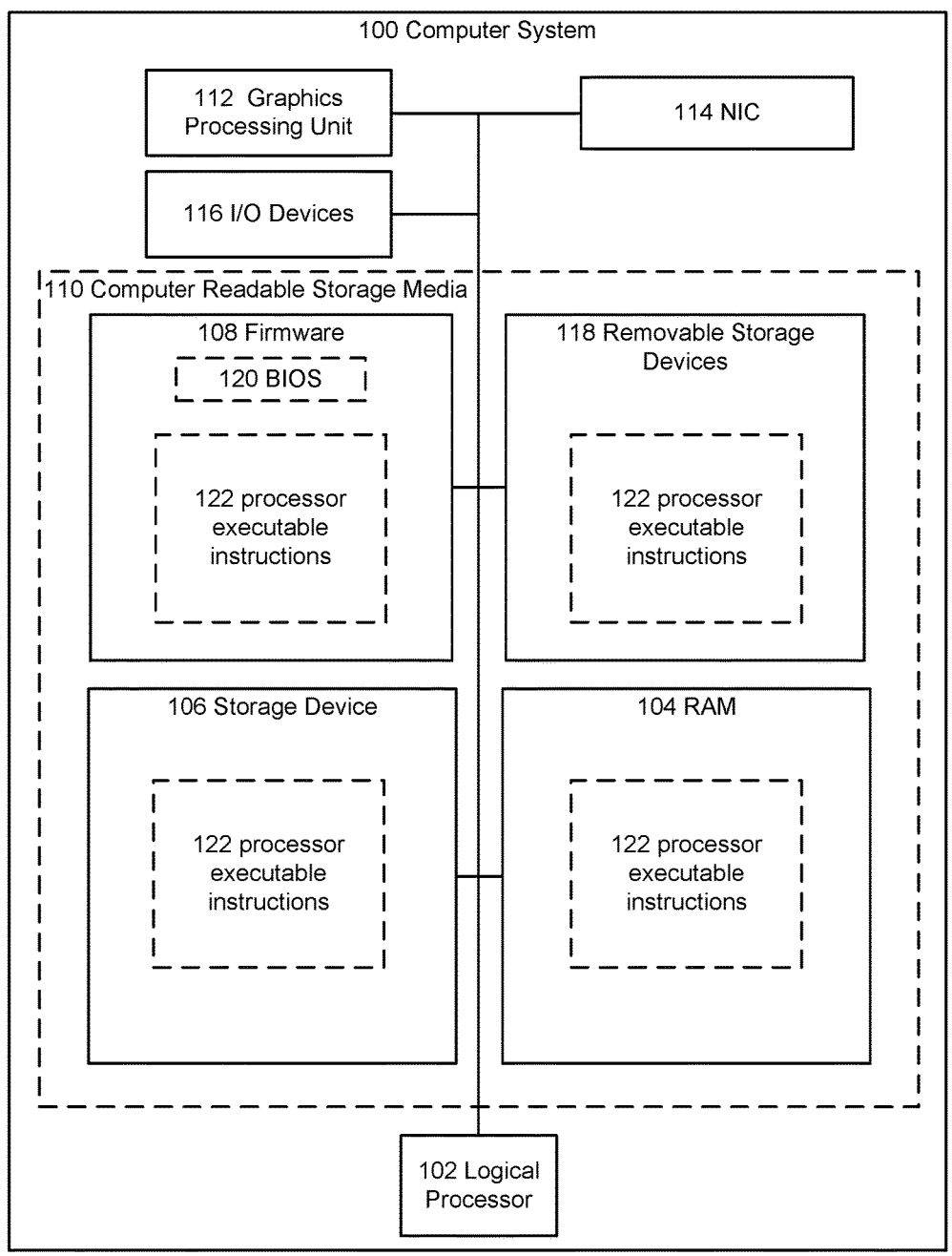
FIG. 1 depicts an example computer system wherein aspects of the present disclosure can be implemented.

Embodiments may execute on one or more computer systems. FIG. 1 and the following discussion are intended to provide a brief general description of a suitable computing environment in which the disclosure may be implemented.

The term circuitry used throughout the disclosure can include hardware components such as hardware interrupt controllers, hard drives, network adaptors, graphics processors, hardware based video/audio codecs, and the firmware used to operate such hardware. The term circuitry can also include microprocessors, application specific integrated circuits, and/or one or more logical processors, e.g., one or more cores of a multi-core general processing unit configured by firmware and/or software. Logical processor(s) can be configured by instructions embodying logic operable to perform function(s) that are loaded from memory, e.g., RAM, ROM, firmware, and/or mass storage. In an example embodiment where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, and Bernoulli cartridges.

The computer readable storage media 110 can provide non volatile and volatile storage of processor executable instructions 122, data structures, program modules and other data for the computer 100 such executable instructions that effectuate manager 250 described in the following figures. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
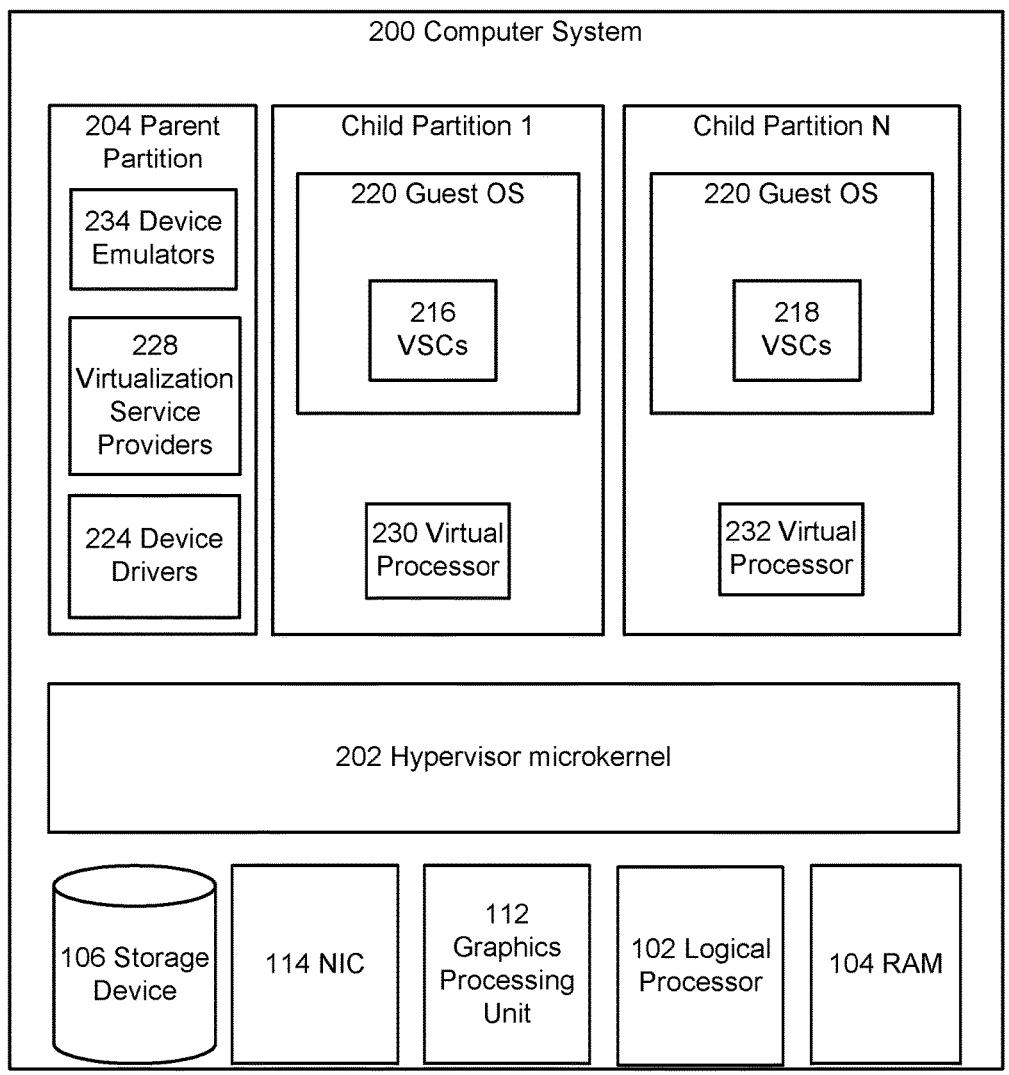
FIG. 2 depicts an operational environment for practicing aspects of the present disclosure.
Figure 3:
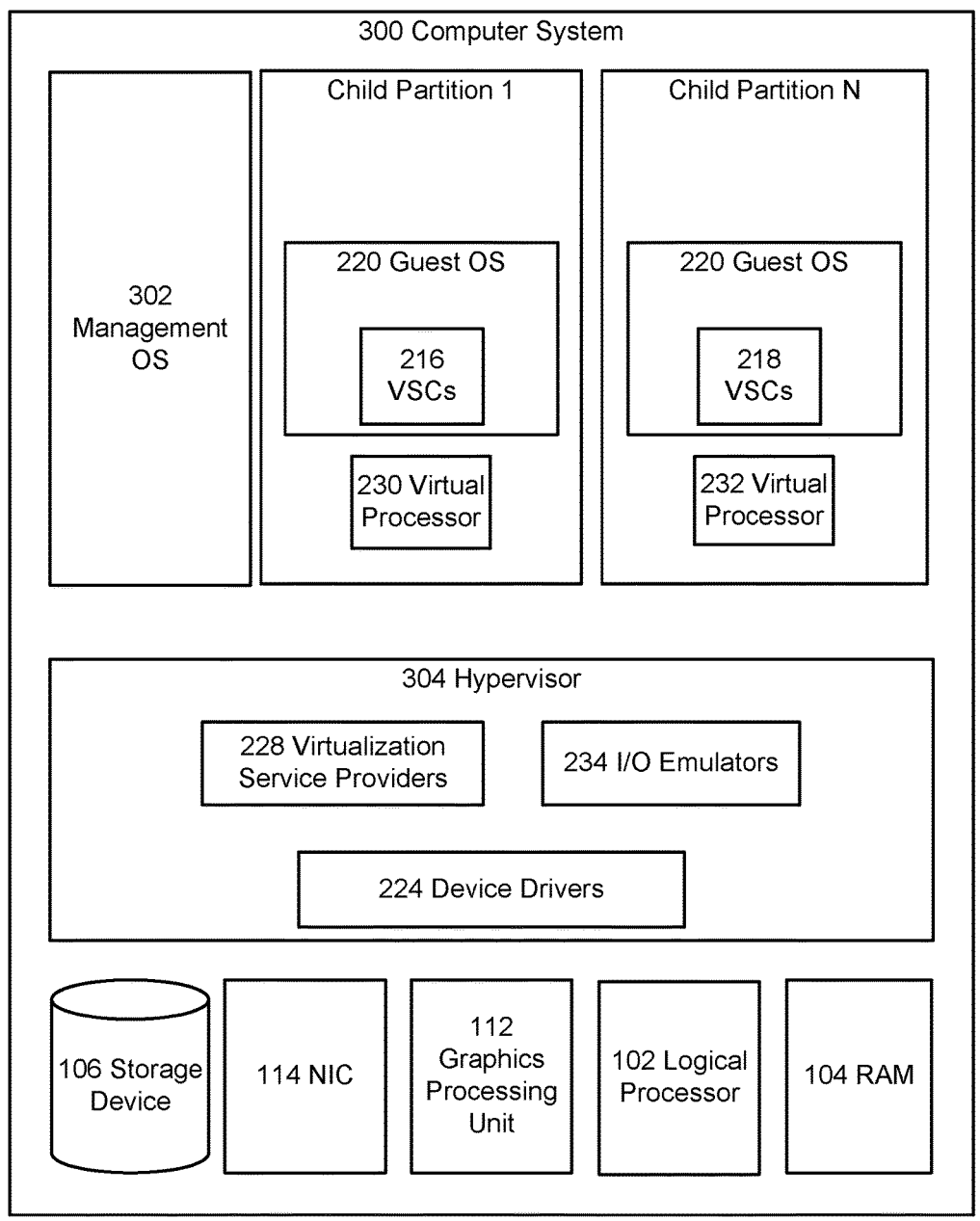
FIG. 3 depicts an operational environment for practicing aspects of the present disclosure.

Referring now to FIGS. 2 and 3, they depict high level block diagrams of computer systems 200 and 300 configured to effectuate virtual machines. In example embodiments of the present disclosure computer systems 200 and 300 can include elements described in FIG. 1 and the following. As shown by the figures, different architectures can exist; however, they generally have similar components. For example, FIG. 2 illustrates an operational environment where a hypervisor, which may also be referred to in the art as a virtual machine monitor, is split into a microkernel 202 and a parent partition 204 whereas FIG. 3 illustrates hypervisor 304 as including elements found in the parent partition 204 of FIG. 2.

Turning to FIG. 2, hypervisor microkernel 202 can be configured to control and arbitrate access to the hardware of computer system 200. Broadly, hypervisor microkernel 202 can generate execution environments called partitions such as child partition 1 through child partition N (where N is an integer greater than 1). In embodiments a child partition is the basic unit of isolation supported by hypervisor microkernel 202. That is, each child partition can be mapped to a set of hardware resources, e.g., memory, devices, logical processor cycles, etc., that is under control of the hypervisor microkernel 202 and hypervisor microkernel 202 can isolate processes in one partition from accessing another partition's resources, e.g., a guest operating system in one partition may be isolated from the memory of another partition and thus may not be able to detect memory addresses outside of its partition. In embodiments hypervisor microkernel 202 can be a stand-alone software product, a part of an operating system, embedded within firmware of the motherboard, specialized integrated circuits, or a combination thereof.

In the depicted example, parent partition component 204, which can also be also thought of as similar to domain 0 of Xen's open source hypervisor. Parent partition 204 in this operational environment can be configured to provide resources to guest operating systems executing in the child partitions 1-N by using virtualization service providers 228 (VSPs) that are typically referred to as back-end drivers in the open source community. Broadly, VSPs 228 can be used to multiplex the interfaces to the hardware resources by way of virtualization service clients (VSCs) (typically referred to as front-end drivers in the open source community) and communicate with the virtualization service clients via communication protocols. As shown by the figures, virtualization service clients can execute within the context of guest operating systems. These drivers are different than the rest of the drivers in the guest in that they may be supplied with a hypervisor, not with a guest. Device emulators 234 are also illustrated and are used to support device divers which are designed to interact with hardware, but when that hardware isn't actually available to a virtual machine. In this example architecture parent partition 204 can gate access to the underlying hardware.

Microkernel 202 can enforce partitioning by restricting a guest operating system's view of system memory. Guest memory is a partition's view of memory that is controlled by a hypervisor. The guest physical address can be backed by system physical address (SPA), i.e., the memory of the physical computer system, managed by hypervisor. As shown by the figure, in an embodiment the GPAs and SPAs can be arranged into memory blocks, i.e., one or more pages of memory. When a guest writes to a block using its page table the data is actually stored in a block with a different system address according to the system wide page table used by hypervisor.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems can include any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Referring now to FIG. 3, it illustrates an alternative architecture to that described above in FIG. 2. FIG. 3 depicts similar components to those of FIG. 2; however in this example embodiment the hypervisor 304 can include the microkernel component and components from the parent partition 204 of FIG. 2 such as the virtualization service providers 228 and device drivers 224 while management operating system 302 may contain, for example, configuration utilities used to configure hypervisor 304. In this architecture hypervisor 304 can perform the same or similar functions as hypervisor microkernel 202 of FIG. 2; however, in this architecture hypervisor 304 can be configured to provide resources to guest operating systems executing in the child partitions. Hypervisor 304 of FIG. 3 can be a stand alone software product, a part of an operating system, embedded within firmware of the motherboard or a portion of hypervisor 304 can be effectuated by specialized integrated circuits.

In example embodiments of the present disclosure boot disks can be configured to include a path to a boot loader used to load the operating system and configuration information for a virtual/physical machine that hosted it. In this way the boot loader can be found when the boot disk is moved and the executing environment hosting the operating system, e.g., the hardware or virtualized hardware, can be configured to reflect an operating environment that operating system expects.

Figure 4:
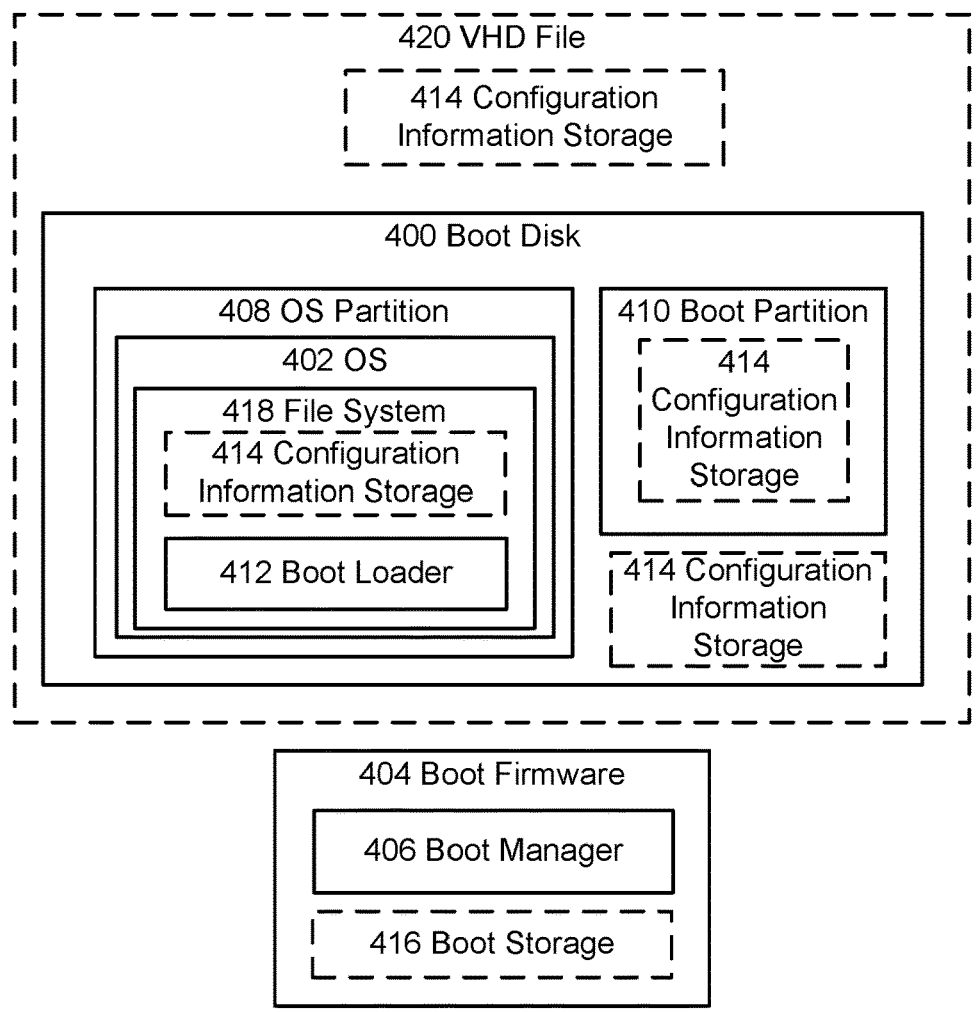
FIG. 4 illustrates an example boot disk.

Turning now to FIG. 4, it illustrates an example boot disk 400 which an operating system stored thereon. The operating system, which may be a guest OS in a virtualized embodiment, can be stored in an operating system partition 408 on the disk. When operating system 402 is installed on boot disk 400 it can create a boot partition 410 and store a boot loader program for loading operating system 402 in some directory, e.g., IDE adaptor\Disk0\ . . . \EFI\bootloader.efi and write information that identifies this path to boot loader 412 in boot firmware 404. Since these programs are created by operating systems each type of operating system may put a boot loader in a different place within its partition 408.

Operating system 402 can store the path to boot loader 412 in boot storage 416, e.g., non-volatile RAM (NVRAM) and configure a boot order list. The boot order list can include an ordered list of device paths to devices that can be booted, e.g., disk, CD-ROM, Networked DISK0, DISK0, DISK1, etc. In embodiments of the present disclosure, boot manger 406 can be reconfigured such that the path is broken up into two variables: a device variable, e.g., IDE adaptor\Disk0\ and a directory variable, e.g., . . . \EFI\bootloader.efi.

After operating system 402 reboots instructions indicative of boot manager 406 can be executed. Boot firmware 404 can be integrated into a motherboard of a computer system, or in virtualized embodiment the instructions that are usually stored in boot firmware 404 can be injected into guest physical addresses of a virtual machine as virtual firmware. In an embodiment boot manager 406 instructions can be loaded into memory and these instructions can be configured to use the path to find the boot loader 412 and run it.

In an embodiment of the present disclosure boot manager 406 can store the path to the boot loader 412 in boot partition 410. For example, boot manager 406 can be configured to write the path to boot loader 412 in a known location on boot partition 410 such as configuration information store 414.

When boot manager 406 runs it can check this known location and determine if it includes a path. Boot manager 406 can then compare the path stored in configuration information store 414 to the path stored in boot storage 416 and determine which one has the newest time stamp. In embodiments of the present disclosure the boot manager 406 can be configured to use the newer path to attempt to find the boot loader 412.

In addition to finding the path, in an embodiment boot manager 406 can be configured to synchronize the information stored in configuration information store 414 with information stored in boot storage 416. For example, in a situation where the path to boot loader 412 is newer in configuration information store 414, boot loader 406 can copy the path into boot store 416. In the opposite case, boot loader 406 can copy the path into configuration information store 414 when the path on boot storage 416 has a newer timestamp.

The path may change due to various reasons. For example, an administrator may physically move a boot disk from one motherboard to another. In a datacenter an administrator may create a web server and clone the boot disk multiple times and place each one in a virtual machine for example. In both of these cases boot firmware 404 may not include a boot variable for the boot disk and the operating system would not load. In another example embodiment boot manager 406 could detect a path in boot partition 410 that is slightly incorrect because the device portion of the path is incorrect. In this example embodiment boot manager 406 can generate a new device portion for the path and store it in boot storage 416. Boot manager 406 can then copy this newly created boot path to configuration information storage 414.

In addition to synchronizing the path to boot loader 412, boot manager 406 can be configured to detect configuration information for the physical machine, or virtual machine, that an operating system was configured to run on and/or the characteristics of the machine that last ran an OS. For example, in a physical machine embodiment, configuration information could include a MAC address for an Ethernet card, the networks the physical machine was connected to, the amount of RAM in the computer system, the amount of processors in the system, etc. In this example embodiment boot manager 406 could execute on a logical processor and detect configuration information store 414. Boot manager 406 could then receive the state information for the physical machine and set the Ethernet card to communicate with a specific MAC address and load operating system 402 for example.

In a virtualized example embodiment the configuration information store 414 could include information such as number and type of virtual processors, an amount of RAM associated with the virtual machine, state of various emulators, e.g., IDE emulator, in the virtual machine, etc. Boot manager 406 could detect the information in configuration information store 414 and use it to set up a virtual machine that has the configuration operating system 502 (it this example a guest operating system) expected. In this example embodiment a hypervisor could use a policy to determine whether or not to instantiate a virtual machine conforming to the information in configuration information store 414. For example, the hypervisor could be configured to give a virtual machine a maximum amount of RAM or virtual processors. In this way the virtual machine won't be given an unreasonable amount of resources.

As illustrated by the figure, in example embodiments configuration information store 414 can be stored in various locations on boot disk 400. For example, in virtualized embodiment where parent partition is virtualizing storage, configuration information store 414 could be located in a virtual hard drive (VHD) file 420 that encapsulates boot disk 400 or any other location on boot disk 400. In this case the boot disk 400 would include the infrastructure associated with VHD file 420. For example, VHD file 420 specifies a virtual machine hard disk that can be encapsulated within a single file in physical storage. In this example boot disk 400 would be a file stored on in storage and a virtual machine storage service, e.g., a VSP of FIG. 2 or 3, can parse the file and effectuate a disk that can be exposed to boot manager 406 as physical storage. The virtual hard disks generated by virtual machine storage service can be attached to a bus that is accessible to boot manager 406 in a way that appears like it is locally attached.

In another virtualized embodiment operating system 402 may be using an iSCSI target as boot disk 400. In this example embodiment configuration information store 414 could be located in boot partition 410, in an area of storage outside of both OS partition 408 and boot partition 410, and/or outside of a file system of operating system 402. Boot partition 410 provides the most flexible storage option because in an embodiment using a boot partition 410 to store an OS loader 412 configuration information store 414 can be collocated. When configuration information store 414 is located outside the partitions, the information could be accidentally overwritten because file management tools don't expect data to be stored outside of partitions. When configuration information store 414 is located within file system 418 disk management tools may not accident destroy the information, however boot manager 406 would need to be configured to interpret file system 418 and know where the configuration information will be stored within file system 418.

Figure 5:
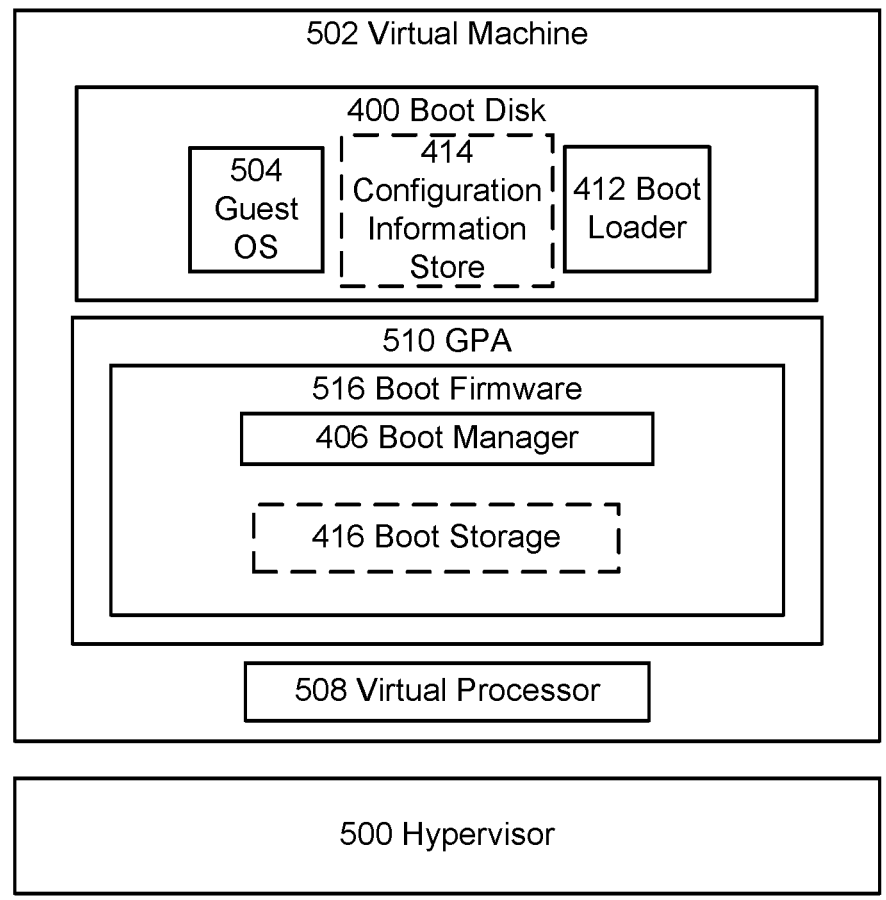
FIG. 5 depicts operational environment for practicing aspects of the present disclosure.

Turning now to FIG. 5, it illustrates a virtualized environment for practicing aspects of the present disclosure. Briefly, FIG. 5 shows a hypervisor 500 which could have an architecture similar to that described on FIG. 2 or FIG. 3, i.e., hypervisor could include a separate parent partition 204 and microkernel 202. Hypervisor 500 can be configured to effectuate virtual machine 502 and place boot firmware 516 into guest physical addresses 510. Virtual processor 508 can run boot manager code 406. Boot manager instructions can then execute and perform functions described throughout the present disclosure.

Figure 6:
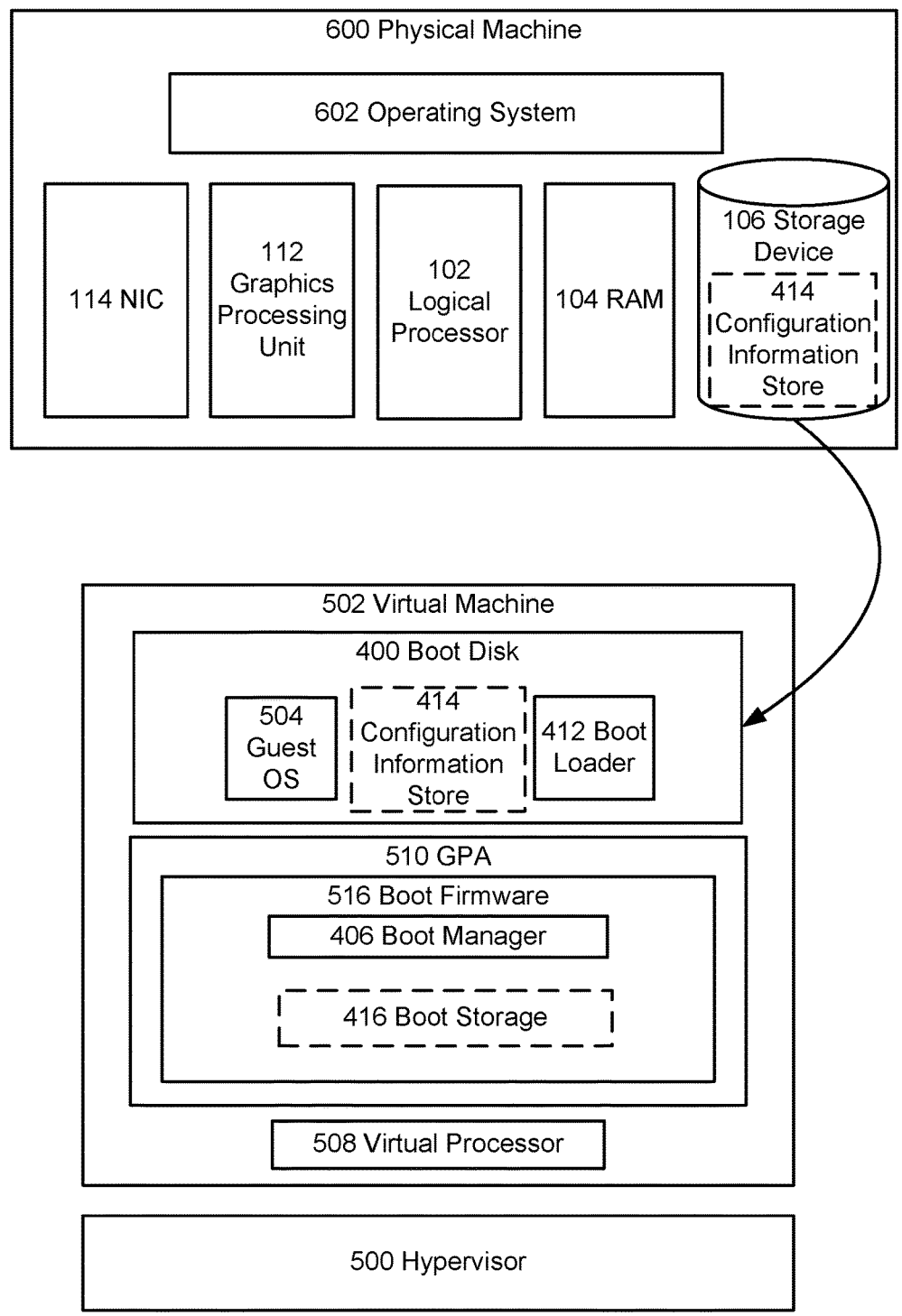
FIG. 6 depicts operational environment for practicing aspects of the present disclosure.

FIG. 6 illustrates another operational environment for practicing aspects of the present disclosure. FIG. 6 shows a virtualized environment similar to the one described in FIG. 5. In addition, FIG. 6 shows a physical computer system 600 including hardware such as a NIC 114, graphics processing unit 112, one or more logical processors 102, RAM 104, and persistent storage 106. In this example embodiment operating system 602 may be migrated from a physical environment to a virtual one. In this example information that describes the state of physical machine 600 could be created by operating system 602 and stored in storage device 106 along with operating system 602. In addition, firmware of physical machine 600 can also be configured to store a path to boot loader for OS 602 on storage device 106 in a predetermined location similar to above. An administrator could copy the image on storage device 106 and store it in, for example, VHD file 420 and virtual machine 502 could be configured to reflect the physical environment of physical machine 600. In this example, when operating system 602 is first migrated boot manager 406 can detect the information in configuration information store 414 and copy, for example, the path to boot loader 412 to boot storage 416 and send the configuration information for physical machine 600 to hypervisor 500.

The following are a series of flowcharts depicting operational procedures. For ease of understanding, the flowcharts are organized such that the initial flowcharts present implementations via an overall "big picture" viewpoint and subsequent flowcharts provide further additions and/or details. Furthermore, one of skill in the art can appreciate that the operational procedure depicted by dashed lines are considered optional.

Figure 7:
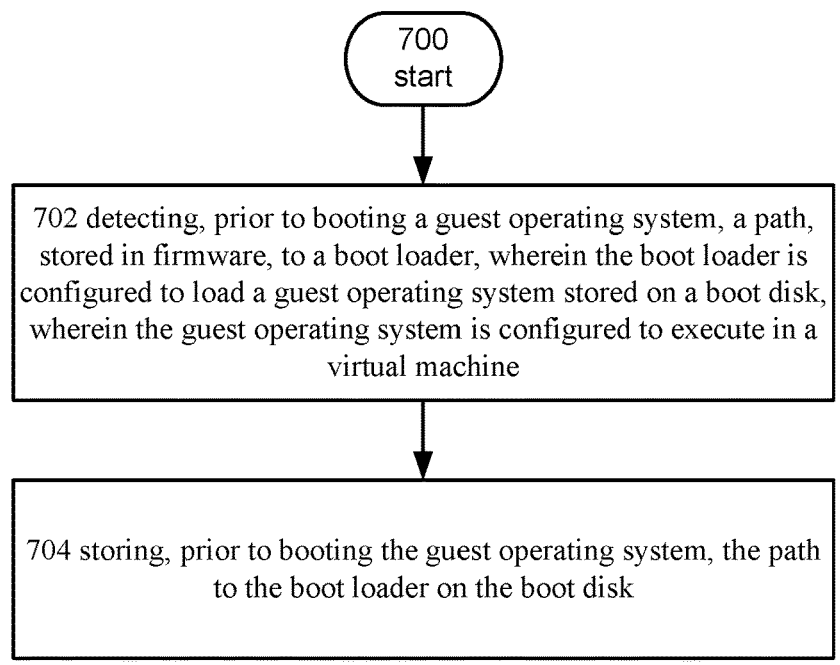
FIG. 7 depicts operational procedure for practicing aspects of the present disclosure.

Turning now to FIG. 7, it illustrates an operational procedure for practicing aspects of the present disclosure including operations 700, 702, and 704. Operation 700 begins the operational procedure and operation 702 shows detecting, prior to booting a guest operating system, a path, stored in firmware, to a boot loader, wherein the boot loader is configured to load a guest operating system stored on a boot disk, wherein the guest operating system is configured to execute in a virtual machine. For example, and turning to FIG. 5, boot manager 406 can be executed by virtual processor 508 and can detect information that describes a path to boot loader 412 that is stored in firmware 516. For example, in an embodiment of the present disclosure guest operating system 504 may have been recently installed on boot disk 400 and may have written a boot variable to boot loader 412 in boot storage 416 that describes the path on boot disk 400 for boot loader 412 so that it can be found. Upon restart boot manager 406 can run and find the boot variable.

Turning to operation 704, it illustrates storing, prior to booting the guest operating system, the path to the boot loader on the boot disk. For example, and continuing with the description of FIG. 7, in an embodiment boot manager 406 can write the path on boot disk to boot loader 412 on boot disk 400 in a predetermined location so that it can be found later by, for example, hypervisor 500 and/or boot manager 406. For example, boot manager 406 can store the path on boot disk 400 before loading guest operating system 504 because at that point boot manager 406 can write to boot disk 400. After guest operating system 504 loads it will have control of boot disk 400.

In this example embodiment if boot disk 400 is migrated to another virtual machine or a physical machine, the path to boot loader 412 can be sent along with it. If hypervisor 500 is configured to generate virtual machine 502 and load guest operating system 504 within its context, boot manager 406 and/or hypervisor 500 can be configured to detect the configuration information store 414 and obtain the stored path to boot loader 412 stored on boot disk 400. Boot manager 406 and/or hypervisor 500 can execute and generate a device variable and directory variable that describes the path to boot loader 412. Boot manager 406 can then run and use the newly created variables to find boot loader 412.

Figure 8:
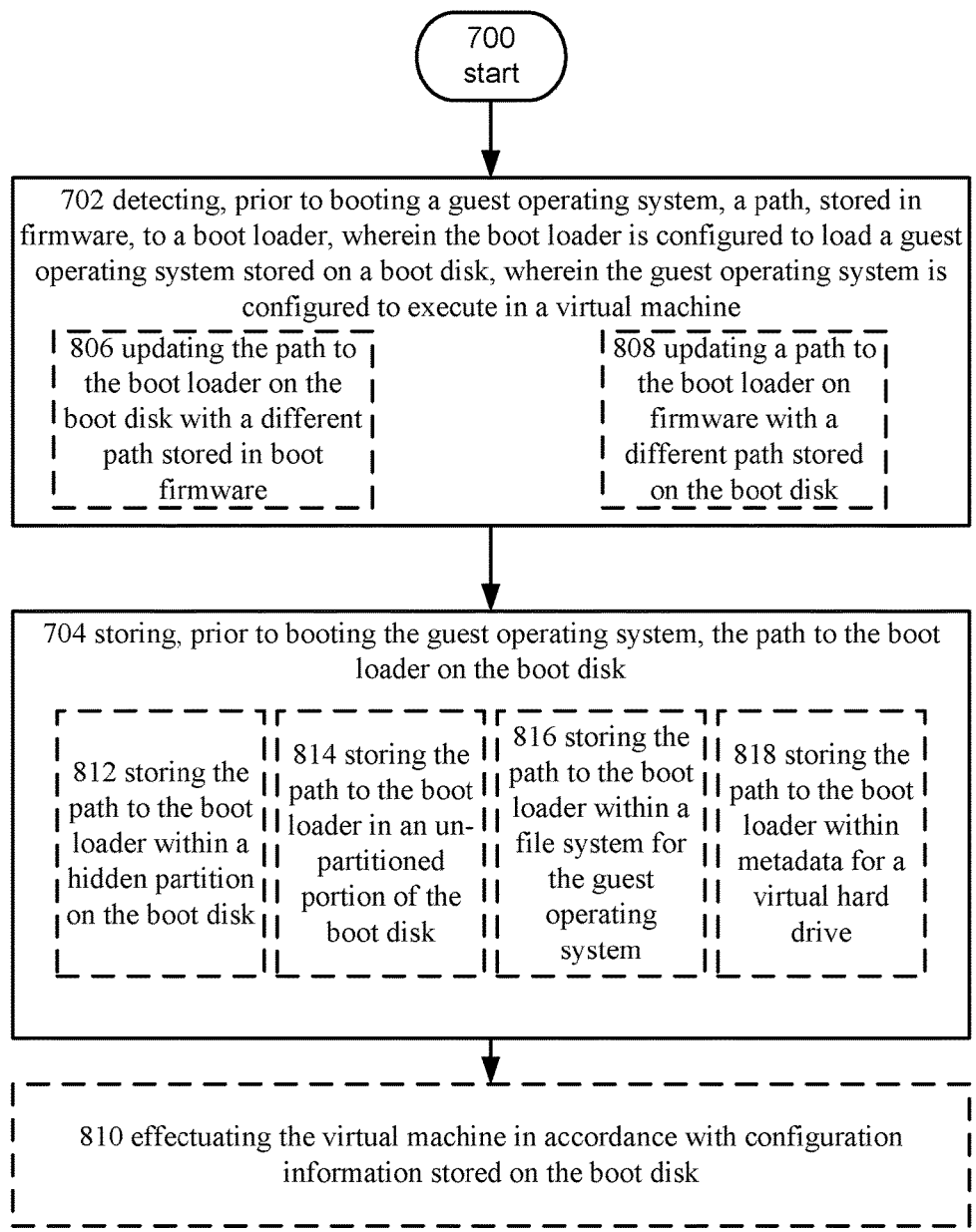
FIG. 8 depicts an alternative embodiment of the operational procedure of FIG. 7.

Turning now to FIG. 8, it illustrates an alternative embodiment of the operational procedure of FIG. 7 including additional operations 806-818. Turning to operation 806 it shows updating the path to the boot loader on the boot disk with a different path stored in boot firmware. For example, in an embodiment of the present disclosure circuitry for storing the path to boot loader 412 can include circuitry for updating the path with information stored in boot firmware 516. For example, and turning to FIG. 5, hypervisor 500 may load virtual firmware 516 code into guest physical addresses 510 when booting guest OS 504 and detect that the path to the boot loader 412 stored in configuration information store 414 is incorrect. For example, the path in configuration information store 414 could have an incorrect device portion of the path stored thereon. In this example boot manager 406 can be configured to determine that the directory portion of the path points to boot loader 412 and update the device portion of the path and store it in boot storage 416. Boot manager 406 could then copy the newly created path to configuration information store 414.

Continuing with the description of FIG. 8, operation 808 shows updating a path to the boot loader on firmware with a different path stored on the boot disk. For example, in an embodiment of the present disclosure circuitry for storing the path to boot loader 412 can include circuitry for updating the path stored in boot firmware 516. For example, in an embodiment boot disk 400 could be placed into virtual machine 502 and boot firmware 516 may not have any boot variables that can load guest operating system 504. In this example boot firmware 406 can run and check to see if any connected storage device includes a configuration information store 414. In the event that a connected storage device includes a configuration information store 414, boot manager 406 can retrieve the path stored therein and create boot variables for the path in boot storage 416. Boot manager 406 could then use the information to find boot loader 412 and load guest operating system 504.

In another example embodiment boot firmware 516 may include boot variables that are out of date. For example, boot disk 400 could be connected as a device, e.g., iSCSI target 1, and the device portion of a path in boot firmware 516 may indicate it is another device, e.g., iSCSI target 0. In this example embodiment boot manager 406 could check configuration information store 414 on iSCSI target 1 and determine that it has a path that shows that the boot loader 412 is stored on iSCSI target 1. In this example boot manager 406 can determine that a timestamp for the path stored in configuration information store 414 is newer than the timestamp for the path stored in boot storage 416. In this example embodiment boot manager 406 can copy the newer path to boot storage 416 and use it to load boot loader 412.

Continuing with the description of FIG. 8, operation 810 shows effectuating the virtual machine in accordance with configuration information stored on the boot disk. For example, and turning to FIG. 5 in an embodiment of present disclosure boot firmware code 516 can be loaded into guest physical addresses 510 and executed by virtual processor 508. Virtual processor 508, configured by boot manager 406, can detect virtual machine configuration information stored in configuration information store 414 and pass this information to hypervisor 500. Hypervisor 500 can process the configuration information and determine the characteristics of the virtual machine that guest operating system 504 is expecting. For example, guest operating system 504 may have been configured to run on a virtual machine having 8 virtual processors and 10 gigabytes of RAM. Hypervisor 500 may determine that virtual machine 502 can be effectuated with these characteristics (by checking a policy); effectuate virtual machine 502; and send a signal to boot manager 406. Boot manager 406 can then use boot variables to identify the path to boot loader 412. Boot manager 412 can then load guest OS 504.

Continuing with the description of FIG. 8, operation 812 shows storing the path to the boot loader within a hidden partition on the boot disk. For example, and turning to FIG. 4, in an embodiment of the present disclosure the path to boot loader 412 can be stored in configuration information store 414 which can be located in any partition that is hidden or is inaccessible to guest operating system. For example, boot manager 406 can create a hidden partition on boot disk 400 prior to the first installation of an operating system and store configuration information store 414 on that.

Continuing with the description of FIG. 8, operation 814 shows storing the path to the boot loader in an un-partitioned portion of the boot disk. For example, and turning to FIG. 4, in an embodiment of the present disclosure the path to boot loader 412 can be stored in configuration information store 414, which can be stored in an un-partitioned portion of boot disk 400. Or put another way, configuration information store 414 can be located outside boot partition 410 and outside OS partition 408. This embodiment is fragile however because operating system 402 may accidentally destroy configuration information 414 unless it is configured to not touch portions of the boot disk outside its partition 408.

Continuing with the description of FIG. 8, operation 816 shows storing the path to the boot loader within a file system for the guest operating system. For example, and turning to FIG. 4, in an embodiment of the present disclosure configuration information store 414 can be stored in file system 418 of operating system 402. In this embodiment boot manager 406 can be configured to read file system 418 and store a file in it that includes boot loader 412. In this example embodiment operating system 402 could mark the file as a system resource so that it is not inadvertently deleted by a user.

Continuing with the description of FIG. 8, operation 818 shows storing the path to the boot loader within metadata for a virtual hard drive. For example, and turning to FIG. 4, in an embodiment of the present disclosure the path to boot loader 412 can be stored in metadata associated with VHD file 420. As stated above, VHD file 420 specifies a virtual machine hard disk that can be encapsulated within a single file in physical storage. In this example boot disk 400 would be a file stored on in storage and a virtual machine storage service, e.g., a VSP of FIG. 2 or 3, can parse the file and effectuate a disk that can be exposed to a virtual machine as physical storage. In this example embodiment boot manager 406 can be configured to send a request to a hypervisor to access configuration information store 414. The hypervisor can then mount the metadata for VHD file 420 and boot manager 406 can access the file and store the path to boot loader 412 in the metadata.

Figure 9:
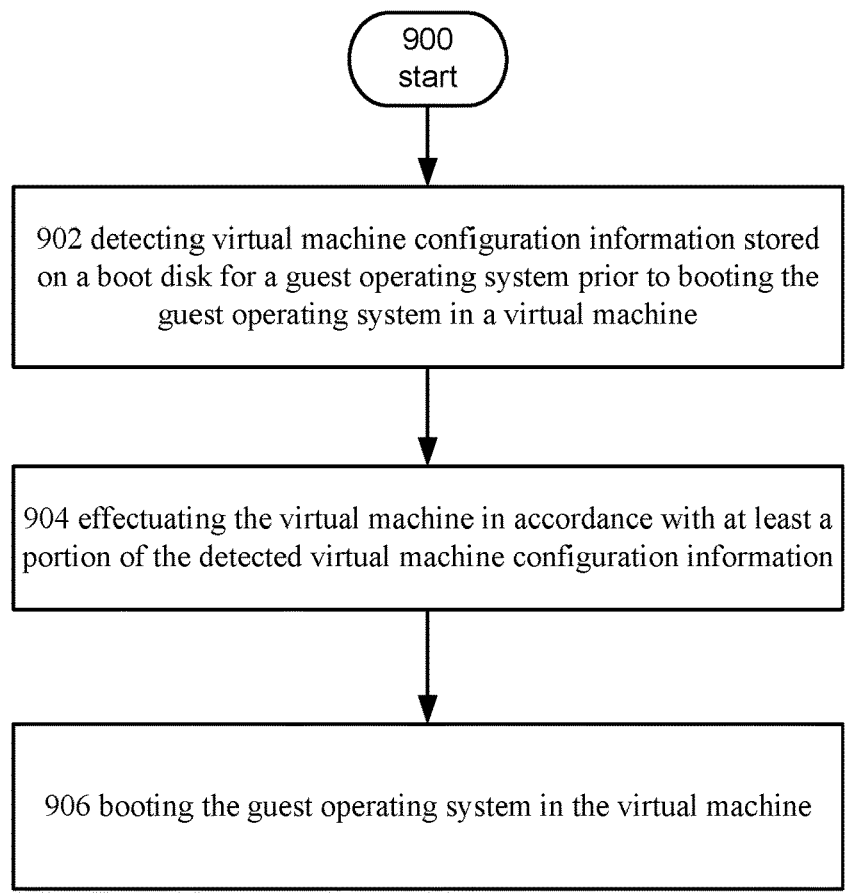
FIG. 9 depicts operational procedure for practicing aspects of the present disclosure.

Turning now to FIG. 9, it illustrates an operational procedure for practicing aspects of the present disclosure including operations 900, 902, 904, and 906. Operation 900 begins the operational procedure and operation 902 shows detecting virtual machine configuration information stored on a boot disk for a guest operating system prior to booting the guest operating system in a virtual machine. For example, and turning to FIG. 5, virtual machine configuration information, e.g., information that describes what virtual devices were attached to a virtual machine, the state of these virtual devices, how many virtual processors were in the virtual machine, the non-uniform memory access ("NUMA") topology of the virtual machine, how much RAM was in the virtual machine, etc., can be stored in configuration information store 414 on boot disk 400. Hypervisor 500 can be configured to boot guest operating system 504 and load boot firmware 516 instructions into guest physical addresses 510. Boot manager 406 can be run on virtual processor 508 and can detect configuration information store 414. Boot manager 406 can obtain the virtual machine configuration information from configuration information store 414 and send the information to hypervisor 500.

Continuing with the description of FIG. 9, operation 904 shows effectuating the virtual machine in accordance with at least a portion of the detected virtual machine configuration information. In an example embodiment hypervisor 500 can receive virtual machine configuration information and can determine to instantiate a virtual machine in accordance with at least some of virtual machine configuration information. For example, hypervisor 500 may be able to give virtual machine 502 the amount of RAM identified in configuration information 414 but not the desired amount of virtual processors based on information in, for example, a policy.

Turning now to operation 906 of FIG. 9, it shows booting the guest operating system in the virtual machine. For example, in an embodiment of the present disclosure after virtual machine 502 is configured by hypervisor 500 control can be passed back to boot manager 406. Boot manager 406 can run on virtual processor 508 and boot loader 412 can be loaded. Boot loader 412 can then run and load guest operating system 504.

Figure 10:
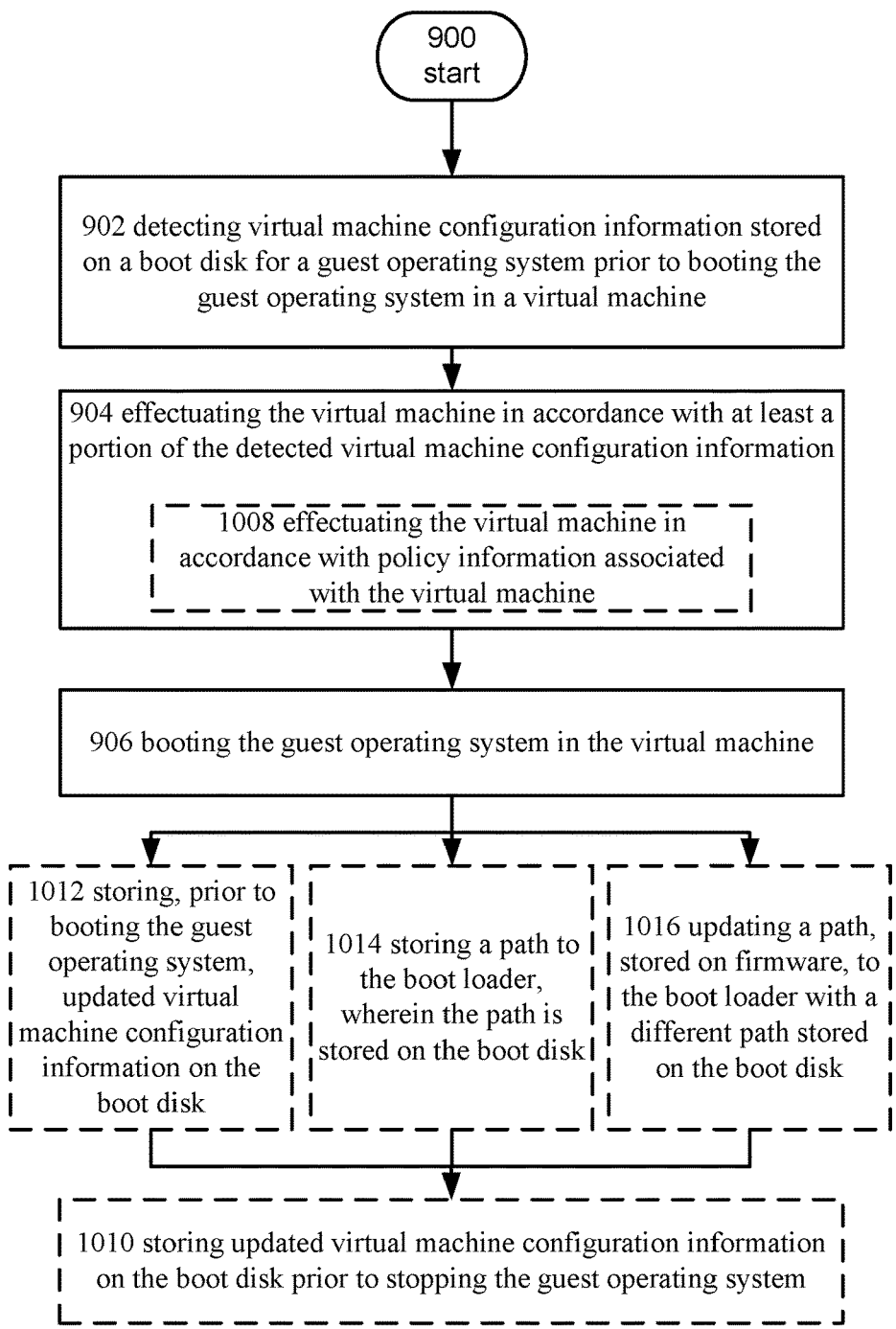
FIG. 10 depicts an alternative embodiment of the operational procedure of FIG. 9.

Turning now to FIG. 10 it illustrates an alternative embodiment of the operational procedure of FIG. 9 including the additional operations 1008-1018. Turning to operation 1008 it shows effectuating the virtual machine in accordance with policy information associated with the virtual machine. For example, in an embodiment of the present disclosure hypervisor 500 can determine what resources to give virtual machine based on policy information associated with virtual machine 502. For example, a table of information can be accessed by hypervisor 500 that describes a policy to use. In an example embodiment the policy could indicate priority levels associated with the virtual machines it is hosting. In this example hypervisor 500 can determine the characteristics of virtual machine 502 based on information retrieved from configuration information store 414 and policy information. For example, priority associated with virtual machine 502 may be high and in an embodiment hypervisor 500 may reallocate resources from other virtual machines in order to honor the virtual machine configuration information stored on boot disk 400.

In another example embodiment the policy information could be used to determine what resources to give to virtual machine 502. For example, a policy can dictate how much RAM a virtual machine or virtual processors virtual machine 502 can be instantiated with. In this example embodiment hypervisor 500 can receive information that describes how many virtual processors are in configuration information store 414 and compare the value to a maximum value stored in a policy. In this example hypervisor 500 can build a virtual machine with the number in configuration information store 414 if it is less than or equal to the maximum value.

Continuing with the description of FIG. 10, operation 1010 shows storing updated virtual machine configuration information on the boot disk prior to stopping the guest operating system. For example, in an embodiment of the present disclosure guest operating system 504 can execute in virtual machine 502 and, for example, hypervisor 500 may have added/removed resources or the state of virtual machine 502 may have changed. For example, the MAC address used by virtual machine 502 may have changed. In this case prior to stopping virtual machine 502, e.g., to live migrate it or store it, guest operating system 504 can be configured to store configuration information for the current status of virtual machine 502 in configuration information store 412. In this way the most up to date configuration information for virtual machine 502 can be sent with its boot disk 400.

Continuing with the description of FIG. 10, operation 1012 shows storing, prior to booting the guest operating system, updated virtual machine configuration information on the boot disk. For example, in an embodiment of the present disclosure boot manager 406 can change the virtual machine configuration information stored in configuration information store 414 to reflect the resources that hypervisor 500 gave to guest operating system 504 prior to booting the OS. For example, hypervisor 500 can change the state of virtual machine 502 by giving it a different amount of RAM, etc. and boot manager 504 can store a copy of this information in configuration information store 414. In this example boot disk 400 can include information about the current environment hosting guest operating system 504. In an example embodiment this information can be stored next to the virtual machine configuration information or it can overwrite the original virtual machine configuration information.

Continuing with the description of FIG. 10, operation 1014 shows storing a path to the boot loader, wherein the path is stored on the boot disk. For example in an embodiment boot manager 406 can write the path to boot loader 412 in a location on boot disk 400 so that it can be found later by, for example, hypervisor 500 and/or boot manager 406.

In this example embodiment boot disk 400 may have been migrated to virtual machine 502 and the path to boot loader 412 may now be incorrect. In this example when boot manager 406 searches configuration information store 414 it may find virtual machine configuration information and an incorrect path to boot loader 412. The virtual machine configuration information can be sent to hypervisor 500 and boot manager 406 can fix up the path to boot loader 412 by changing the device dependent portion of the path and saving it to boot store 516 and configuration information store 414.

Continuing with the description of FIG. 10, operation 1016 shows updating a path, stored on firmware, to the boot loader with a different path stored on the boot disk. For example, in an embodiment of the present disclosure circuitry for storing the path to boot loader 412 can include circuitry for updating the path stored in boot firmware 516. For example, in an embodiment boot disk 400 could be placed into virtual machine 502 and boot firmware 516 may not have any boot variables that can load operating system 504. In this example boot manager 406 can run and check to see if any connected storage device includes a configuration information store 414. In the event that a connected storage device includes a configuration information store 414 boot manager 406 can retrieve the path stored therein and create boot variables for the path in boot storage 416. Boot manager 414 could then use the information to find boot loader 412 and boot guest operating system 504.

Figure 11:
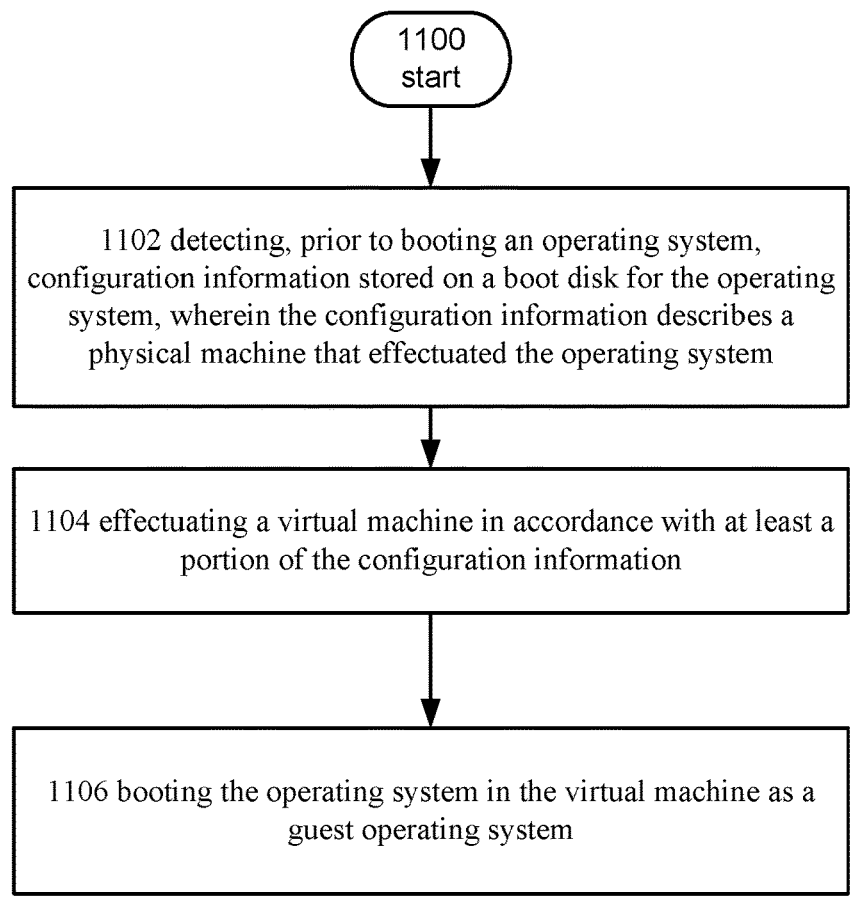
FIG. 11 depicts operational procedure for practicing aspects of the present disclosure.

Turning now to FIG. 11, it shows an operational procedure for practicing aspects of the present disclosure including operations 1100, 1102, 1104, and 1106. Operation 1100 begins the operational procedure and operation 1102 shows detecting, prior to booting an operating system, configuration information stored on a boot disk for the operating system, wherein the configuration information describes a physical machine that effectuated the operating system. For example and turning to FIG. 6, in an embodiment of the present disclosure boot manager 406 can detect configuration information store 414 on boot disk 400, e.g., within metadata of virtual hard disk 520, within a boot partition or any other partition, etc. As illustrated by the figure, in an embodiment the configuration information store 414 can include information that describes at least a portion of the physical machine that effectuated operating system 602. For example, operating system 602 may have been executing on physical machine 600 and an administrator may have determined to move it from physical machine 600 to virtual machine 502. In this example embodiment the characteristics for the physical hardware in physical machine 600 can be obtained such as networks it was attached to, number of processors it included etc. For example, a tool could be run and the information can be obtained and stored in a boot disk, e.g., storage device 106.

An administrator could then take a copy of storage device 106 and clone it one or more times. The administrator could then deploy it to a computer system running hypervisor 500 and direct hypervisor 500 to load operating system 602 as guest operating system 504. This example is typically referred to as a physical-to-virtual migration. Hypervisor 500 can be configured to run virtual machine 502 and load boot firmware 516 into guest memory 510. Boot manager 406 can execute and search configuration information store 414 for configuration information that describes the characteristics of physical machine 600. Boot manager 406 can locate the information and pass it to hypervisor 500.

Continuing with the description of FIG. 11, operation 1104 shows effectuating a virtual machine in accordance with at least a portion of the configuration information. For example, boot manager 406 can send configuration information that identifies the characteristics of physical machine 600 to hypervisor 500. Hypervisor 500 can determine that virtual machine 600 can be effectuated with at least a portion of these characteristics; and effectuate virtual machine 502.

Turning now to operation 1106, it shows booting the operating system in the virtual machine as a guest operating system. For example, in an embodiment of the present disclosure after virtual machine 502 is configured by hypervisor 500 control can be passed back to boot manager 406. Boot manager 406 can run on virtual processor 508 and boot loader 412 can be loaded. Boot loader 412 can then run and load guest operating system 504.

Figure 12:
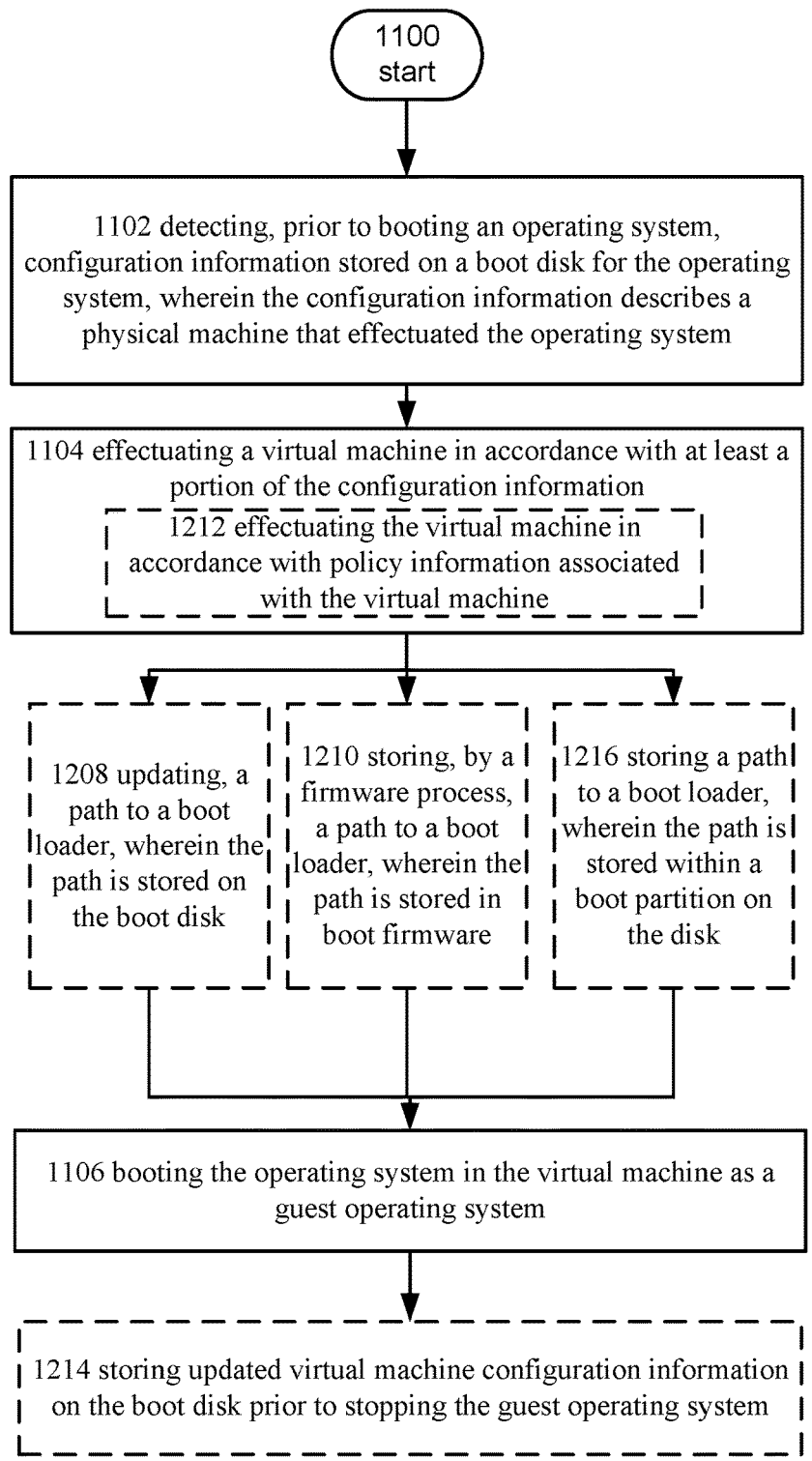
FIG. 12 depicts an alternative embodiment of the operational procedure of FIG. 11.

Turning to FIG. 12, it illustrates an alternative embodiment of the operational procedure of FIG. 11 including the additional operations 1208, 1210, 1212, 1214, and 1216. Operation 1208 shows updating, a path to a boot loader, wherein the path is stored on the boot disk. For example, in an embodiment of the present disclosure boot manager 406 can store the instant path to boot loader 412 on boot disk 400. Hypervisor 500 can be configured to run virtual machine 502 and load boot firmware 516 into guest memory 510. Boot manager 406 can execute and attempt to locate boot loader 412 for guest operating system 504. In this example embodiment boot manager 406 can detect that it does not include a boot variable for a boot device and search configuration information store 414 for a path. Boot manager 406 can discover, for example, an incorrect path in configuration information store 414 and can determine the correct path. For example, the device dependent portion of the path may be incorrect because boot disk 400 is being expressed in virtual machine 502 as a different type of disk than it was originally. In this case boot manager 406 can store the updated path in boot storage 416 and update the path in configuration information store 414.

Operation 1210 shows storing, by a firmware process, a path to a boot loader, wherein the path is stored in boot firmware. For example, in an embodiment of the present disclosure the path can be detected in configuration information store 414 and stored in boot storage 416. For example, after the physical-to-virtual migration hypervisor 500 can be configured to run virtual machine 502 and load boot firmware 516 into guest memory 510. Boot manager 406 can execute and attempt to locate boot loader 412 for guest operating system 504. In this example embodiment boot manager 406 can detect that it does not include a boot variable for a boot device and search configuration information store 414 for a path. Boot manager 406 can discover the path and store boot variables in boot storage 416 that describe the path.

Operation 1212 shows effectuating the virtual machine in accordance with policy information associated with the virtual machine. For example, in an embodiment of the present disclosure hypervisor 500 can determine what resources to give virtual machine based on policy information associated with virtual machine 502. For example, a table of information can be accessed by hypervisor 500 that describes a policy to use. In an example embodiment the policy could indicate priority levels associated with the virtual machines it is hosting. In this example hypervisor 500 can determine the characteristics of virtual machine 502 based on information retrieved from configuration information store 414 and policy information. For example, priority associated with virtual machine 502 may be high and in an embodiment hypervisor 500 may reallocate resources from other virtual machines in order to honor the virtual machine configuration information stored on boot disk 400.

Operation 1214 shows storing updated virtual machine configuration information on the boot disk prior to stopping the guest operating system. For example, in an embodiment of the present disclosure guest operating system 504 can execute in virtual machine 502 and, for example, hypervisor 500 may have added/removed resources or the state of virtual machine 502 may have changed. For example, the MAC address used by virtual machine 502 may have changed. In this case prior to stopping virtual machine 502, e.g., to live migrate it or store it, guest operating system 504 can be configured to store configuration information for the current status of virtual machine 502 in configuration information store 412. In this way the most up to date configuration information for virtual machine 502 can be sent with its boot disk 400.

Operation 1216 shows storing a path to a boot loader, wherein the path is stored within a boot partition on the disk. For example, and turning to FIG. 4, in an embodiment of the present disclosure the path to boot loader 412 can be stored in configuration information store 414 which can be located in a boot partition 410 of boot disk 400. For example, during an installation process, boot manager 406 or another boot process, can create boot partition 410 and reserve enough memory to store configuration information store 414.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A computer readable storage device, excluding signals per se, comprising computer readable instructions that upon execution on a computing device cause the computing device at least to:

detect, prior to initiating a boot of a guest operating system, a path to a boot loader, the path to the boot loader stored in a boot partition, wherein the boot loader is configured to load a guest operating system stored on a boot disk, wherein the guest operating system is configured to execute in a virtual machine; and store, prior to booting the guest operating system, the path to the boot loader on the boot disk.

2. The computer readable storage device of claim 1, wherein the boot disk comprises an operating system (OS) partition (408), and the guest OS is stored in the guest OS partition.

3. The computer readable storage device of claim 2, wherein the boot disk further comprises a boot partition (410) and a boot loader (412) configured to load the guest OS.

4. The computer readable storage device of claim 3, wherein the guest OS is configured to store a directory path to the boot loader in a boot storage memory (416).

5. The computer readable storage device of claim 4, further comprising boot firmware instructions (404) including boot manager instructions (406), wherein the boot firmware instructions are injected into guest physical addresses of the virtual machine as virtual firmware, and wherein the boot manager instructions are configured to use the directory path to find and run the boot loader.

6. The computer readable storage device of claim 5, wherein the boot manager is configured to store the path to the boot loader in a configuration information store (414) of the boot partition.

7. The computer readable storage device of claim 6, wherein the boot manager is further configured to synchronize information stored in the configuration information store with information stored in a boot storage memory (416).

8. The computer readable storage device of claim 7, wherein the boot manager is further configured to detect configuration information stored in the configuration information store, said configuration information including information about a number and type of virtual processors, and the amount of RAM associated with the virtual machine, and to use said information to set up the virtual machine.

9. A boot device selection and recovery method, comprising:

detecting, prior to initiating a boot of a guest operating system, a path to a boot loader, the path to the boot loader stored in a boot partition, wherein the boot loader is configured to load a guest operating system stored on a boot disk, wherein the guest operating system is configured to execute in a virtual machine; and storing, prior to booting the guest operating system, the path to the boot loader on the boot disk.

10. The method of claim 9, wherein the boot disk comprises an operating system (OS) partition (408), and the guest OS is stored in the guest OS partition.

11. The method of claim 10, wherein the boot disk further comprises a boot partition (410) and a boot loader (412) configured to load the guest OS.

12. The method of claim 11, wherein the guest OS is configured to store a directory path to the boot loader in a boot storage memory (416).

13. The method of claim 12, further comprising providing boot firmware instructions (404) including boot manager instructions (406), wherein the boot firmware instructions are injected into guest physical addresses of the virtual machine as virtual firmware, and wherein the boot manager instructions are configured to use the directory path to find and run the boot loader.

14. The method of claim 13, wherein the boot manager is configured to store the path to the boot loader in a configuration information store (414) of the boot partition.

15. The method of claim 14, wherein the boot manager is further configured to synchronize information stored in the configuration information store with information stored in a boot storage memory (416).

16. The method of claim 15, wherein the boot manager is further configured to detect configuration information stored in the configuration information store, said configuration information including information about a number and type of virtual processors, and the amount of RAM associated with the virtual machine, and to use said information to set up the virtual machine.

17. A computing device, comprising:
a processor; and
a computer readable storage device coupled to said processor and comprising computer readable instructions that, upon execution, cause the computing device at least to:
  detect, prior to initiating a boot of a guest operating system, a path to a boot loader, the path to the boot loader stored in a boot partition, wherein the boot loader is configured to load a guest operating system stored on a boot disk, wherein the guest operating system is configured to execute in a virtual machine; and
  store, prior to booting the guest operating system, the path to the boot loader on the boot disk.

* * * * *